US012746422B2

(12) United States Patent
Lee et al.

(10) Patent No.: US 12,746,422 B2
(45) Date of Patent: Sep. 29, 2026

(54) FIRE EXTINGUISHING DEVICE AND SYSTEM FOR SUPPRESSION OF ELECTRIC VEHICLE BATTERY FIRE

(71) Applicant: LEE MOBILITY INC., Daejeon (KR)

(72) Inventors: Jae Hwan Lee, Daejeon (KR); Seung Eun Lee, Daejeon (KR)

(73) Assignee: LEE MOBILITY INC., Daejeon (KR)

( * ) Notice: Subject to any disclaimer, the term of this patent is extended or adjusted under 35 U.S.C. 154(b) by 418 days.

(21) Appl. No.: 18/480,597

(22) Filed: Oct. 4, 2023

(65) Prior Publication Data

US 2024/0115892 A1 Apr. 11, 2024

(30) Foreign Application Priority Data

Oct. 5, 2022 (KR) ........................ 10-2022-0126696

(51) Int. Cl.

| | |
|---|---|
| ***A62C 27/00*** | (2006.01) |
| ***A62C 3/07*** | (2006.01) |
| ***A62C 3/16*** | (2006.01) |
| ***A62C 31/12*** | (2006.01) |
| ***B05B 1/20*** | (2006.01) |
| ***B05B 15/72*** | (2018.01) |

(52) U.S. Cl.

CPC ................ *A62C 27/00* (2013.01); *A62C 3/07* (2013.01); *A62C 3/16* (2013.01); *A62C 31/12* (2013.01); *B05B 15/72* (2018.02); *B05B 1/20* (2013.01)

(58) Field of Classification Search

CPC .. A62C 27/00; A62C 3/07; A62C 3/16; A62C 31/12; B05B 15/72; B05B 1/20

USPC ................................ 169/52, 62, 61; 239/302

See application file for complete search history.

(56) References Cited

U.S. PATENT DOCUMENTS

| | | | | |
|---|---|---|---|---|
| 11,779,786 B2 * | 10/2023 | Yang | A62C 37/42 169/11 |
| 2009/0205846 A1 * | 8/2009 | Zeweke | A62C 3/07 169/45 |
| 2011/0155192 A1 * | 6/2011 | Ahmad | B60S 1/68 134/56 R |
| 2018/0289996 A1 * | 10/2018 | Kim | A62C 37/04 |
| 2019/0091716 A1 * | 3/2019 | Fuller | B63B 35/00 |
| 2021/0387031 A1 | 12/2021 | Yang | |

(Continued)

FOREIGN PATENT DOCUMENTS

| | | |
|---|---|---|
| KR | 10-2021-0008543 A | 1/2021 |
| KR | 10-2021-0154282 A | 12/2021 |
| KR | 10-2022-0008986 A | 1/2022 |

(Continued)

*Primary Examiner* — Kevin Edward Schwartz

(74) *Attorney, Agent, or Firm* — ROTHWELL, FIGG, ERNST & MANBECK, P.C.

(57) ABSTRACT

The present disclosure relates to a fire extinguishing device and system for suppression of electric vehicle battery fire and, more specifically, to a fire extinguishing device and system wherein in the event of a fire caused by a battery of an electric vehicle, the fire extinguishing device is moved to a space under the electric vehicle, a nozzle tip rod protrudes upward such that a part of the nozzle tip rod is inserted into the battery pack mounted on the bottom of the vehicle, and then firefighting water or a fire extinguishing agent is injected and charged into a space inside the battery pack, thereby quickly stabilizing the battery and preventing additional fires caused by battery explosion.

6 Claims, 5 Drawing Sheets

(56) References Cited

U.S. PATENT DOCUMENTS

| | | | | |
|---|---|---|---|---|
| 2023/0241432 | A1 * | 8/2023 | Park | A62C 3/07<br>169/62 |

FOREIGN PATENT DOCUMENTS

| | | | | | |
|---|---|---|---|---|---|
| KR | 10-2376222 | B1 | | 3/2022 | |
| KR | 10-2407326 | B1 | | 6/2022 | |
| KR | 10-2410804 | B1 | | 6/2022 | |
| KR | 10-2416007 | B1 | | 7/2022 | |
| KR | 10-2431466 | B1 | | 8/2022 | |
| WO | WO-2021146763 | A1 | * | 7/2021 | A62C 31/22 |
| WO | WO-2021190809 | A1 | * | 9/2021 | A62C 3/07 |

* cited by examiner

FIRE EXTINGUISHING DEVICE AND SYSTEM FOR SUPPRESSION OF ELECTRIC VEHICLE BATTERY FIRE

CROSS-REFERENCE TO RELATED APPLICATION(S)

This application is based on and claims priority under 35 U.S.C. 119 to Korean Patent Application No. 10-2022-0126696, filed on Oct. 5, 2022, in the Korean Intellectual Property Office, the disclosure of which is herein incorporated by reference in its entirety.

BACKGROUND OF THE INVENTION

1. Field of the Invention

The present disclosure relates to a fire extinguishing device and system for suppression of electric vehicle battery fire and, more specifically, to a fire extinguishing device and system wherein in the event of a fire caused by electric vehicle battery, the fire extinguishing device is moved to a space under the electric vehicle, a nozzle tip rod protrudes upward such that a part of the nozzle tip rod is inserted into the battery pack mounted on the bottom of the vehicle, and then firefighting water or a fire extinguishing agent is injected and charged into a space inside the battery pack, thereby quickly stabilizing the battery and preventing an additional fire caused by battery explosion.

2. Description of the Prior Art

In general, vehicles used internal combustion engines that use gasoline or diesel fuel, but recently, due to the problem of carbon dioxide emitted from internal combustion engines, the spread of electric vehicles, which are eco-friendly energy vehicles, has been increasing. This trend is leading to a growing trend around the world to phase out internal combustion engine vehicles due to global warming issues. In contrast, the supply of electric vehicles is steadily increasing every year, and their market share is expected to increase further in the future.

The battery, which is the most important element in these electric vehicles, includes a single battery pack, formed by multiple built-in battery modules to enable long-term use on a single charge, and then is installed on the lower side of the vehicle. The battery pack may cause a fire due to various reasons, including external shocks, and this may occur even while driving or charging an electric vehicle.

In the case of an electric vehicle fire, even if the vehicle body flames are initially extinguished, a secondary fire may occur in the battery over time. Before the battery is stabilized, the flames continue to be generated from the battery, and thus the fire eventually continues until the entire battery is burned out.

Therefore, it is generally essential to stabilize the battery within 24 hours after the primary fire is extinguished. However, since the battery is safely protected from external shocks, it is difficult to perform a battery stabilizing operation using a fire extinguishing agent or firefighting water.

Korean Patent Application No. 10-2407326 (registered on Jun. 20, 2022) proposes a cooling tank for stabilizing a battery of an electric vehicle on fire. The application above proposes that an inner wall and an outer wall are installed to contain an electric vehicle, and water is filled in the inside thereof such that a vehicle battery is immersed and stabilized in the water.

In addition, Korean Patent Application No. 10-2376222 (registered on Mar. 15, 2022) and Korean Patent Application No. 10-2431466 (registered on Aug. 8, 2022) presents a cooling tank and method, the method including installing a lifting tube or lifting bag that is placed on the floor of an electric vehicle to lift the electric vehicle, connecting the electric vehicle to the lifting tube while the electric vehicle is lifted, or laying an individual waterproof plate on the installation floor, and forming a wall to prevent firefighting water from being discharged through a gap between the existing floor and the wall, thereby ensuring battery stabilization.

As mentioned above, all prior documents employ a method in which a temporary water tank is prepared to contain an electric vehicle, and then is filled with firefighting water to submerge a battery in the firefighting water.

However, the method described above significantly reduces the amount of firefighting water to be used, compared to the previous method of injecting firefighting water, but still requires firefighting water sufficient to submerge a vehicle, and a battery electrolyte is mixed with firefighting water due to damage caused by battery explosion, and contaminates nearby groundwater, rivers, and soil when discharged.

Accordingly, there is a need for a new fire suppression system optimized for electric vehicle fires, which can quickly stabilize batteries while reducing the amount of firefighting water used in the event of the electric vehicle fires, thereby preventing fire from continuing after suppression.

SUMMARY OF THE INVENTION

An aspect of the present disclosure is to provide a fire extinguishing device and system for suppress of electric vehicle battery fire, wherein the device is placed in a space under a part where an electric vehicle battery is installed, and a nozzle tip rod configured to be drawn out by hydraulic/pneumatic pressure is inserted into a space inside a battery pack to fill the space inside the battery pack with firefighting water or a fire extinguishing agent, thereby achieving rapid stabilization.

A fire extinguishing device for suppression of electric vehicle battery fire includes: a mobile vehicle body equipped with a movable wheel to move to a space under an electric vehicle, and having a plurality of outlet holes formed through the upper surface thereof and a connection terminal formed on the side surface thereof; a nozzle tip rod installed vertically inside each of the plurality of outlet holes of the mobile vehicle body, having a pointed upper end to penetrate a battery pack placed on the bottom of the electric vehicle when rising vertically, so as to be partially inserted into the battery pack, and having a plurality of nozzles formed on the side surface inserted into the battery pack, to inject firefighting water or a fire extinguishing agent supplied through the connection terminal; a hydraulic/pneumatic cylinder installed inside the mobile vehicle body to vertically move the nozzle tip rod by receiving hydraulic/pneumatic pressure through the connection terminal; and a control panel configured to control the operation of the hydraulic/pneumatic cylinder.

In addition, a hydraulic/pneumatic lift may be further installed on the mobile vehicle body such that a support protrudes downward to raise the mobile vehicle body when hydraulic/pneumatic pressure is supplied thereto, thereby enabling the operation of the nozzle tip rod when the mobile vehicle body is in close contact with the bottom of the electric vehicle.

In addition, fixing hooks may be installed on both front and rear side surfaces of the mobile vehicle body, and the fixing hooks may be rotated by hydraulic/pneumatic pressure to press both sides of the lower part of the electric vehicle, thereby fixing the mobile vehicle body to the lower part of the electric vehicle.

In addition, the connection terminal of the mobile vehicle body may be connected to a hydraulic/pneumatic pressure supply line communicating with the hydraulic/pneumatic cylinder, a firefighting water or fire extinguishing agent supply line communicating with the nozzle tip rod, and a control and power supply line configured to supply various controls and power.

In addition, the nozzle tip rod may have a screw-shaped upper end, and may be gear-coupled to the hydraulic/pneumatic cylinder or an electric motor to receive rotational force so as to move upward while rotating.

In addition, a fire extinguishing system for suppression of electric vehicle battery fire according to the present disclosure includes: a fire extinguishing device including a nozzle tip rod, a hydraulic/pneumatic cylinder, and a control panel, provided on a mobile vehicle body including a connection terminal; and an electric vehicle fire extinguishing vehicle including a storage compartment configured to store the fire extinguishing device, a fire extinguishing tank configured to store firefighting water or a fire extinguishing agent, and an operation unit disposed on one side thereof to operate the fire extinguishing device, and the electric vehicle fire extinguishing vehicle being connected to the connection terminal of the separate fire extinguishing device through a firefighting water or extinguishing agent supply line and a control and power supply line and having a hydraulic/pneumatic pressure supply line connected to the connection terminal to supply hydraulic/pneumatic pressure to the fire extinguishing device.

In addition, the electric vehicle fire extinguishing vehicle may further include a recovery tank, wherein the electric vehicle fire extinguishing vehicle communicates with the connection terminal of the fire extinguishing device via a discharge line, some nozzle tip rods among the plurality of nozzle tip rods of the fire extinguishing device are connected to communicate with the discharge line instead of the firefighting water or fire extinguishing agent supply line such that the firefighting water or the fire extinguishing agent injected into a battery pack is discharged and collected to the recovery tank of the electric vehicle fire extinguishing vehicle through the discharge line, thereby prevent damage due to overpressure caused by the firefighting water or the fire extinguishing agent injected into the battery pack.

The present disclosure provides a fire extinguishing device and system for suppression of electric vehicle battery fire, wherein the device is moved to a space under an electric vehicle, and then a nozzle tip rod directly protrudes into a battery pack mounted on the bottom of the vehicle such that firefighting water or a fire extinguishing agent is injected through a nozzle of the nozzle tip rod located inside the battery pack to fill the battery, thereby achieving rapid stabilization and preventing flames from additional battery explosions.

The fire extinguishing device of the present disclosure connects a plurality of connection lines to a dedicated vehicle, to enable the operation thereof by receiving power or hydraulic/pneumatic pressure from the dedicated vehicle, and to further allow firefighting water or a fire extinguishing agent to be supplied and injected into the battery pack.

In addition, separate recovery is enabled by some nozzle tip rods performing a process of suctioning firefighting water or a fire extinguishing agent charged in the battery pack and discharging the same to the outside, thereby preventing environmental pollution due to unauthorized discharge and improving cooling efficiency due to the firefighting water and the fire extinguishing agent circulating within the battery pack.

In addition, the present disclosure may provide a useful device in which a process of charging firefighting water or a fire extinguishing agent and a process of partially discharging the firefighting water or the fire extinguishing agent are carried out at the same time within the battery pack, to partially buffer charge pressure so as to prevent damage to the battery pack due to overpressure, thereby enabling stabilizing operation to be performed stably.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Figure 1A:
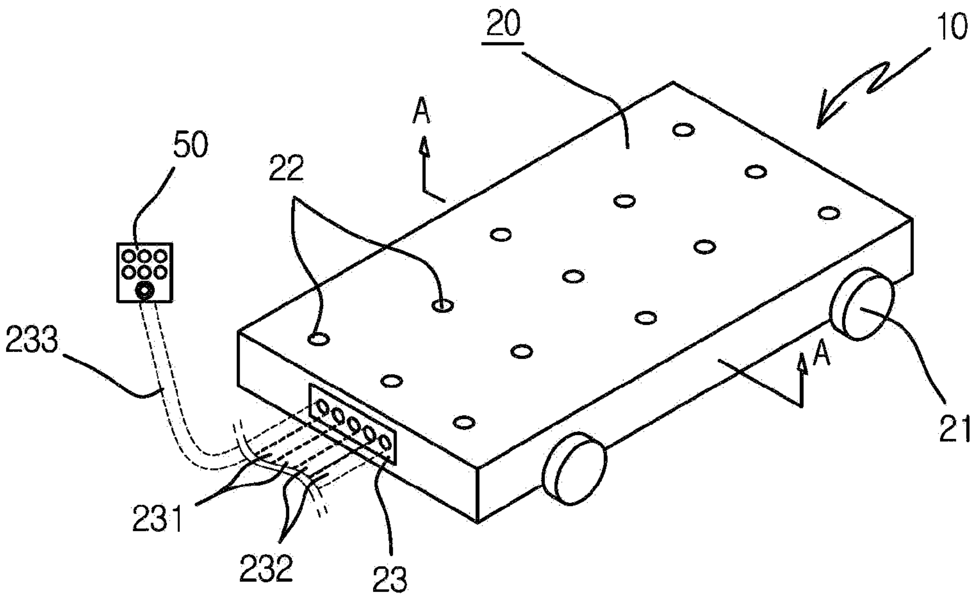
FIGS. 1A and 1B are a perspective view and a schematic cross-sectional view, respectively, illustrating a fire extinguishing device according to a preferred embodiment of the present disclosure.

Hereinafter, embodiments of the present disclosure will be described in detail with reference to the attached drawings. Since the present disclosure can be subjected to various modifications and take various forms, specific embodiments will be illustrated in the drawings and the present disclosure will be described in detail herein. However, this is not intended to limit the present disclosure to a specific disclosed form, and should be understood to include all changes, equivalents, and substitutes included in the spirit and technical scope of the present disclosure. While describing each drawing, similar reference numerals are used for similar components. In the attached drawings, the dimensions of the structures are enlarged or reduced from the actual size to ensure clarity of the present disclosure.

The terms used in the present application are merely used to describe a specific embodiment, and are not intended to limit the present disclosure. The singular forms are intended to include the plural forms unless the context clearly indicates otherwise. In the description, it should be understood that the terms "comprising", "including", or "having" indicate existence of a feature, a numeral, a step, an operation, a structural element, or a combination thereof, and do not previously exclude the existences or probability of addition of one or more another features, numeral, steps, operations, structural elements, or combinations thereof.

Unless defined differently, all terms used herein, which include technical terminologies or scientific terminologies, have the same meaning as what is generally understood by a person skilled in the art to which the present disclosure belongs. It should be interpreted that the terms, which are identical to those defined in general dictionaries, have the meaning identical to that in the context of the related technique. The terms should not be ideally or excessively interpreted as a formal meaning unless not clearly defined.

Figure 1B:
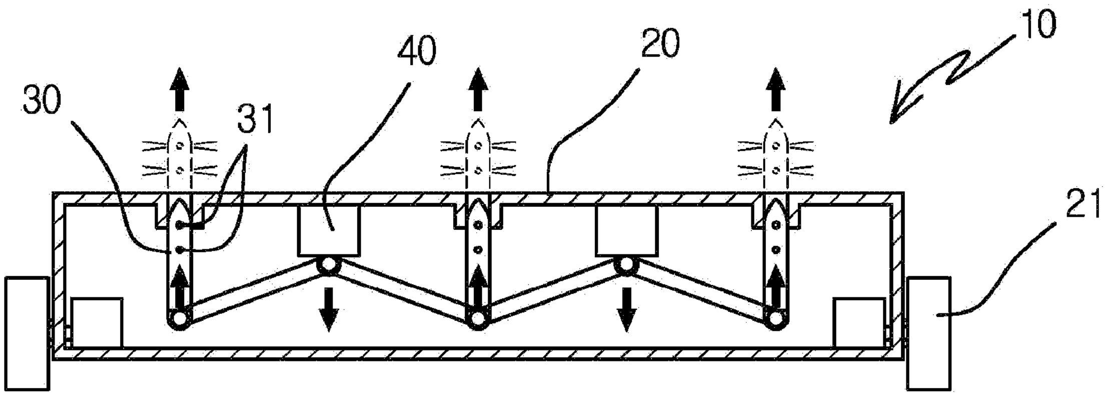

FIGS. 1A and 1B are a perspective view and a cross-sectional view, respectively, schematically illustrating a fire extinguishing device according to a preferred embodiment of the present disclosure.

The fire extinguishing device 10 according to the present disclosure includes a mobile vehicle body 20 equipped with a mobile means and moving to a space under an electric vehicle, a nozzle tip rod installed inside the mobile vehicle body and configured to be moved vertically, a hydraulic/pneumatic cylinder 40 configured to move the nozzle tip rod, and a control panel 50 configured to control various operations.

The mobile vehicle body 20 has an installation space formed therein and includes a movable wheel 21, which is a mobile means installed on one side thereof. The movable wheels 21 may be formed on both side surface of the mobile vehicle body or may be installed on the inner portion of the bottom of the mobile vehicle body, and may be provided in a railway form other than a wheel form.

The mobile vehicle body 20 described above may be driven automatically by transmitting power to the movable wheel, and power may be supplied in the form of hydraulic/pneumatic pressure or power sources such that the mobile vehicle body is driven by the operation of a hydraulic/pneumatic cylinder and a motor. In addition, a pushrod may be provided on the mobile vehicle body such that the mobile vehicle body is manually pushed to a desired location.

In addition, the mobile vehicle body 20 may have a plurality of outlet holes 22 formed on the upper surface thereof. The outlet hole 22 allows the nozzle tip rod 30 to be described later, to rise and be exposed to the outside or descend to be brought into the inner space of the mobile vehicle body, and the mobile vehicle body 20 may further have a vertical guide pipe installed therein to support such that the nozzle tip rod can move in the vertical direction.

In addition, the mobile vehicle body 20 may further include a connection terminal 23 formed on one side thereof. The connection terminal 23 is a terminal for allowing various lines to be connected thereto, such as a firefighting water or fire extinguishing agent supply line 232, a hydraulic/pneumatic pressure supply line 231, and a control and power supply line 233, which will be described later. Therefore, each supply line from the outside may be easily attached to or detached from the connection terminal, enabling supply of firefighting water or a fire extinguishing agent, hydraulic/pneumatic pressure, and power, and control delivery. Inside the mobile vehicle body 20, each internal component is connected to a supply pipe from the connection terminal 23, enabling delivery of firefighting water or the fire extinguishing agent, hydraulic/pneumatic pressure, power, and a control signal, provided from the outside. For example, the hydraulic/pneumatic pressure is provided to the connection terminal by connecting the hydraulic/pneumatic pressure supply line 231 to the connection terminal 23, and an internal hydraulic/pneumatic pipe is installed from the connection terminal 23 to the hydraulic/pneumatic cylinder for driving the nozzle tip rod or the hydraulic/pneumatic cylinder for driving the wheels, which is a driving device inside the mobile vehicle body, so that the hydraulic/pneumatic pressure supplied to the connection terminal is supplied to each device used inside the mobile vehicle body, thereby performing an operation.

The nozzle tip rod 30 is vertically mounted on the bottom of the outlet hole 22 of the mobile vehicle body and is connected to the hydraulic/pneumatic cylinder 40 to ascend and descend in the vertical direction by the operation of the hydraulic/pneumatic cylinder such that the upper part thereof is revealed or concealed through the outlet hole 22 of the mobile vehicle body.

The nozzle tip rod 30 has a pointed end formed on the upper end thereof, and a plurality of nozzles 31 formed through the side surface thereof. In addition, a firefighting water or fire extinguishing agent supply line is installed at the lower end of the nozzle tip rod 30 to allow communication therebetween. Here, the nozzle 31 may be formed on the side surface of the nozzle tip rod 30, which is located inside the battery pack when the nozzle tip rod rises and passes through the bottom of the battery pack to be inserted thereinto.

The nozzle tip rod 30 configured as described above moves upward through the outlet hole of the mobile vehicle body by the operation of the hydraulic/pneumatic cylinder, and penetrates a lower body protection plate and a battery pack 91 of the electric vehicle 90 located above the mobile vehicle body while ascending, such that a part of the nozzle tip rod 30 is disposed inside the battery pack 91. When the nozzle tip rod, especially the part where the nozzle is formed, is placed inside the battery pack 91, firefighting water or a fire extinguishing agent is supplied from the outside to the lower part of the nozzle tip rod, and the supplied firefighting water or fire extinguishing agent moves along the internal flow channel of the nozzle tip rod and is ultimately injected into the inner space of the battery pack through the nozzle on the side surface of the nozzle tip rod, so that the inner space of the battery pack is filled with the firefighting water or the fire extinguishing agent, thereby lowering the internal temperature of the battery pack and suppressing a continuous fire caused by repeating explosions of a battery module.

The hydraulic cylinder 40 is operated by receiving hydraulic/pneumatic pressure through a hydraulic/pneumatic pressure supply line 231 coupled to the connection terminal 23. A plurality of hydraulic/pneumatic cylinders are further provided inside the mobile vehicle body, and each hydraulic/pneumatic cylinder is connected to the connection terminal through a hydraulic/pneumatic pipe to perform an operation.

This hydraulic/pneumatic cylinder 40 connects an arm rod to the end of a cylinder rod, and transmits power to the nozzle tip rod 30 or the movable wheel 21 through the arm rod to enable vertical and rotational movement. The link structure of the hydraulic/pneumatic cylinder 40, the nozzle tip rod 30, and the movable wheel 21 enables power transmission through various known methods.

The control panel 50 not only transmits hydraulic/pneumatic pressure to the hydraulic/pneumatic cylinder to control same, but also controls various operations of the fire extinguishing device, and is allowed to be spaced a predetermined distance away from the mobile vehicle body 20 through an electric wire to enable control of the mobile vehicle body at a safe point spaced a predetermined distance away from the electric vehicle on fire.

The connection between the control panel 50 and the mobile vehicle body 20 may be achieved through the control and power supply line 233, and the control and power supply line may be detachably coupled to the connection terminal 23 of the mobile vehicle body to improve storage thereof.

Figure 2A:
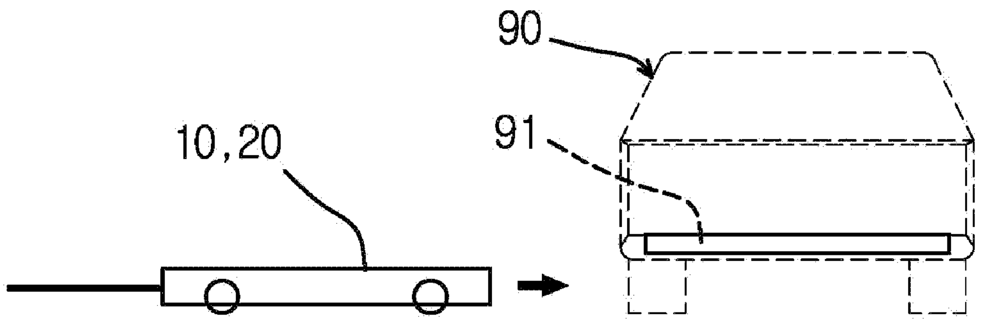
FIGS. 2A to 2C are schematic diagrams illustrating a process of bringing a fire extinguishing device close to an electric vehicle and extinguishing the fire according to the present disclosure.
Figure 2B:
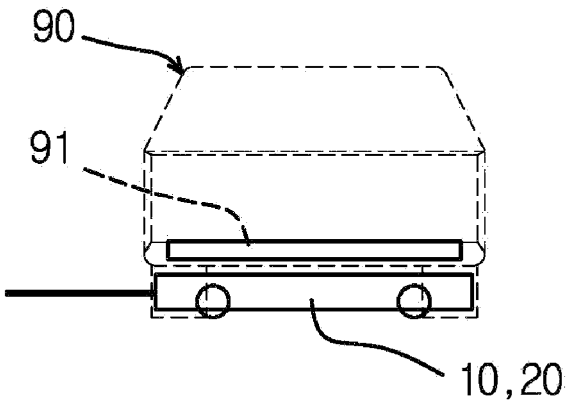
Figure 2C:
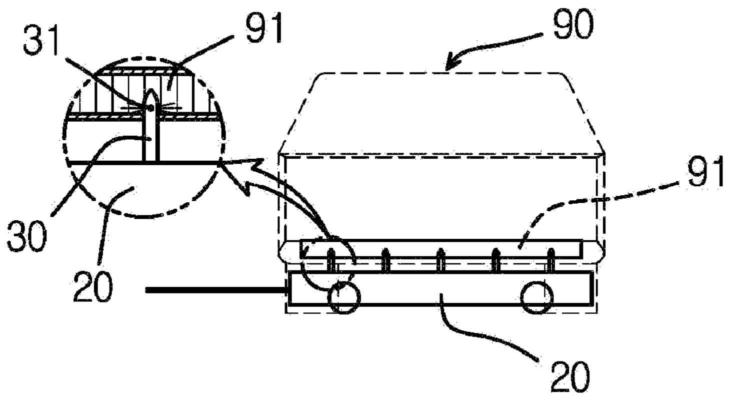

FIGS. 2A to 2C are schematic diagrams illustrating a process of suppressing the fire on an electric vehicle according to an embodiment of the present disclosure.

As mentioned above, when a fire occurs in the electric vehicle 90, the flames generated in the vehicle body may be extinguished by injecting firefighting water from the outside. However, a battery pack, which is the cause of the ignition, has a sealed structure. Accordingly, it is difficult to inject firefighting water into the battery pack by using an injection method performed from the outside of the battery pack. Therefore, explosions of a battery module inside the battery pack occur continuously, making fire suppression difficult.

According to the present disclosure, the fire extinguishing device 10 is moved to a space under the electric vehicle 90, especially to be located under the mounted battery pack 91, by manipulating the control panel 50 connected to the mobile vehicle body 20, the hydraulic/pneumatic cylinder 40 is operated to raise the nozzle tip rod 30 installed on the mobile vehicle body 20, and the nozzle tip rod 30 having been moved upward through the outlet hole 22 of the mobile vehicle body sequentially penetrates a safety cover and the battery pack 91 on the bottom of the electric vehicle such that the nozzle tip rod 30 is partially inserted into the battery pack 91.

Then, when firefighting water or a fire extinguishing agent from the outside is supplied through the firefighting water or fire extinguishing agent supply line 232 connected to the connection terminal 23, the supplied firefighting water or fire extinguishing agent is supplied to each nozzle tip rod 30 through an internal pipe and is injected into the battery pack 91 through the nozzle 31 formed through the nozzle tip rod 30, whereby the inside of the battery pack is filled with the firefighting water or the fire extinguishing agent. Leakage may occur due to a partially damaged battery pack. However, the effect in which each battery module inside the battery pack is immersed in a water tank formed of firefighting water or a fire extinguishing agent may be provided by increasing the injection amount to be more than the discharge amount, thereby achieving rapid battery stabilization by using a small amount of firefighting water or a fire extinguishing agent.

Figure 3A:
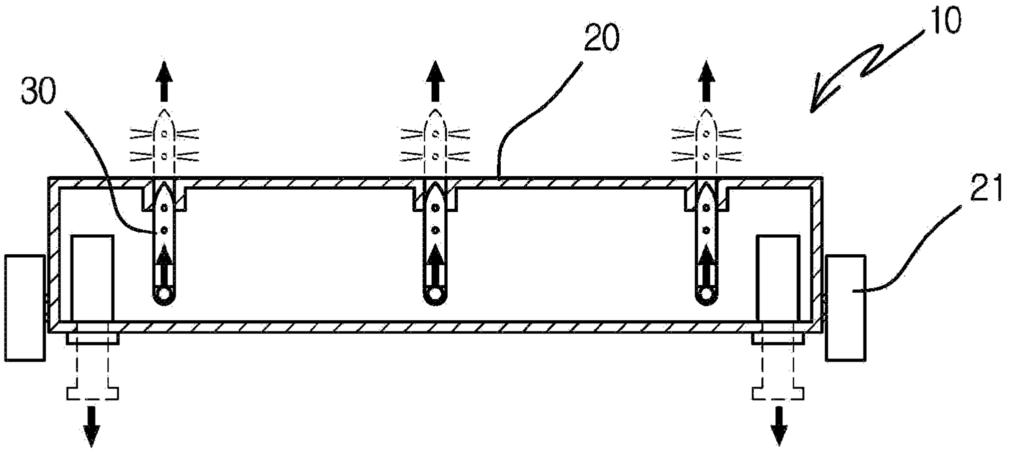
FIG. 3A is a cross-sectional view illustrating a fire extinguishing device equipped with a hydraulic/pneumatic lift according to the present disclosure.

As shown in FIG. 3A, a hydraulic/pneumatic lift 24 may be further installed on the bottom of the mobile vehicle body 20.

The hydraulic/pneumatic lift 24 operates by receiving, through the internal pipe, hydraulic/pneumatic pressure introduced through the hydraulic/pneumatic pressure supply line 231 coupled to the connection terminal 23, and causes a support to protrudes downward during the operation to lift the mobile vehicle body. The mobile vehicle body 20 raised through the support of the hydraulic/pneumatic lift 24 is brought into close contact with the bottom of the electric vehicle 90, that is, the safety cover under the mounted battery pack. At least four hydraulic/pneumatic lifts 24 may be provided at the corners of the lower part of the mobile vehicle body to stably raise and lower the mobile vehicle body, whereby the mobile vehicle body 20 can move upward while maintaining a horizontal state.

When the nozzle tip rod 30 is operated while in close contact with the lower part of the electric vehicle 90 by the hydraulic/pneumatic lift 24, as described above, the nozzle tip rod may be inserted into the vehicle body through the lower part of the electric vehicle by the length protruding from the mobile vehicle body. Therefore, the insertion depth of the nozzle tip rod may be adjusted as necessary to inject firefighting water or a fire extinguishing agent into the battery pack.

Figure 3B:
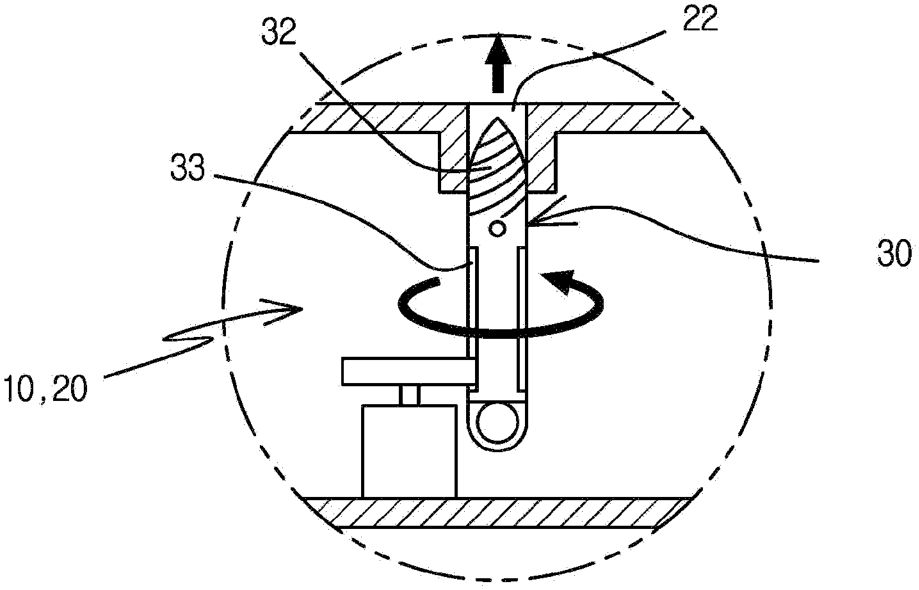
FIG. 3B is a schematic diagram illustrating a threaded nozzle tip rod according to the present disclosure.

FIG. 3B is a schematic diagram illustrating an example of a screw-shaped nozzle tip rod according to the present disclosure. As illustrated in FIG. 3B, the nozzle tip rod 30 has the upper end formed in the shape of a screw 32 and receives rotational force from hydraulic/pneumatic pressure or electric motor to rise and rotate by the operation of the hydraulic/pneumatic cylinder, thereby facilitating penetration of the nozzle tip rod into the lower part of the electric vehicle.

For example, the nozzle tip rod may include a side gear 33 concentrical therewith and formed on the side surface thereof to be elongated in the axial direction. The side gear may be linked in various forms with an auxiliary hydraulic/pneumatic cylinder and an electric motor, and thus rotational force may be transmitted through the side gear when the nozzle tip rod moves vertically, thereby enabling axial rotation of the nozzle tip rod.

In addition, the side gear 33 may be formed on the outer surface of the nozzle tip rod in a recessed form rather than in a protruding gear tooth form, to prevent the nozzle tip rod from being caught when drawn out through the outlet hole of the mobile vehicle body.

Figure 4A:
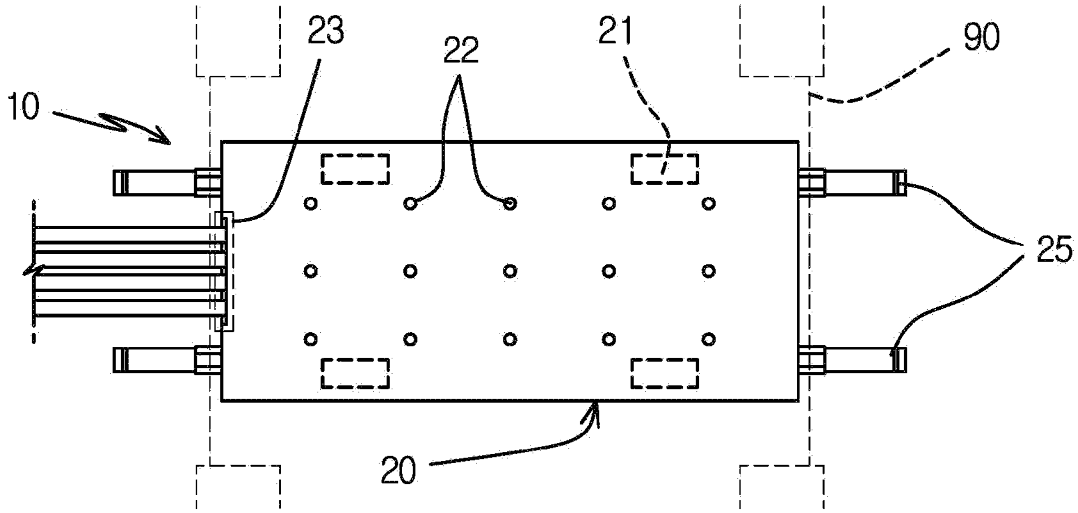
FIGS. 4A and 4B are a plan view and a front view, respectively, schematically illustrating an operation process of a fire extinguishing device equipped with a fixing hook according to the present disclosure.

Referring to FIG. 4A, according to the present disclosure, a pair of fixing hooks 25 are installed on the front and rear end sides of the mobile vehicle body 20 to correspond to the moving direction thereof, such that the fixing hooks 25 are rotatable in the forward/backward direction to hold the vehicle. That is, two front fixing hooks and two rear fixing hooks are installed to be spaced a predetermined distance from each other.

Figure 4B:
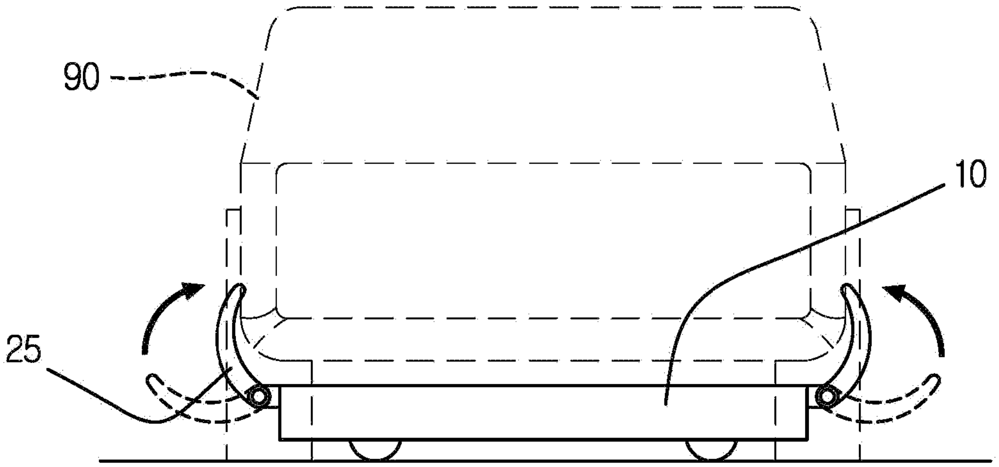

As shown in FIG. 4B, when the mobile vehicle body 20 moves from the side surface of the electric vehicle 90 to the space under the electric vehicle 90 to overlap other and then transmits hydraulic/pneumatic pressure to the fixing hooks 25 while placed under the electric vehicle, the fixing hooks 25 rotate upward such that the front and rear fixing hooks press the side surfaces of the lower part of the electric vehicle to be integrally coupled to each other.

Therefore, the mobile vehicle body 20, that is, the fire extinguishing device, is integrally coupled to the lower part of the electric vehicle 90 by the four fixing hooks 25, and vertically moves the nozzle tip rod 30 without shaking while being integrally coupled, whereby the nozzle tip rod 30, to allow the nozzle tip rod 30 to sequentially penetrate the safety cover and battery pack 91 on the bottom of the electric vehicle.

The fixing hook 25 and the hydraulic/pneumatic lift 24 may be provided together so that the mobile vehicle body 20 is brought into close contact with the lower part of the electric vehicle 90 by the hydraulic/pneumatic lift 24, and the fixing hook 25 is operated to integrally coupled to the mobile vehicle body. Then, the nozzle tip rod 30 is operated to inject firefighting water and a fire extinguishing agent into the battery pack.

As described above, the fire extinguishing device 10 for suppression of electric vehicle battery fire according to the present disclosure has a connection terminal 23 formed on one side surface of the mobile vehicle body 20. The connection terminal may be formed on the rear side of the mobile vehicle body such that approaching the flames is avoided as much as possible when accessing an electric vehicle on fire.

The connection terminal 23 basically includes a hydraulic/pneumatic pressure supply line 231, a firefighting water or fire extinguishing agent supply line 232, and a control and power supply line 233. A plurality of hydraulic/pneumatic pressure supply lines 231 may be provided to allow hydraulic/pneumatic pressure to be supplied individually to each component of the mobile vehicle body, or the mobile vehicle body may include a hydraulic/pneumatic distributor provided therein to allow hydraulic/pneumatic pressure to be distributed and supplied through a hydraulic/pneumatic pipe installed therein, by controlling the hydraulic/pneumatic distributor through a control line or the control and power supply line 233.

The connection terminal 23 and each supply line may be configured in a detachable structure so that each supply line can be connected when in use, and the supply lines can be separated to be stored separately when not in use.

Figure 5A:
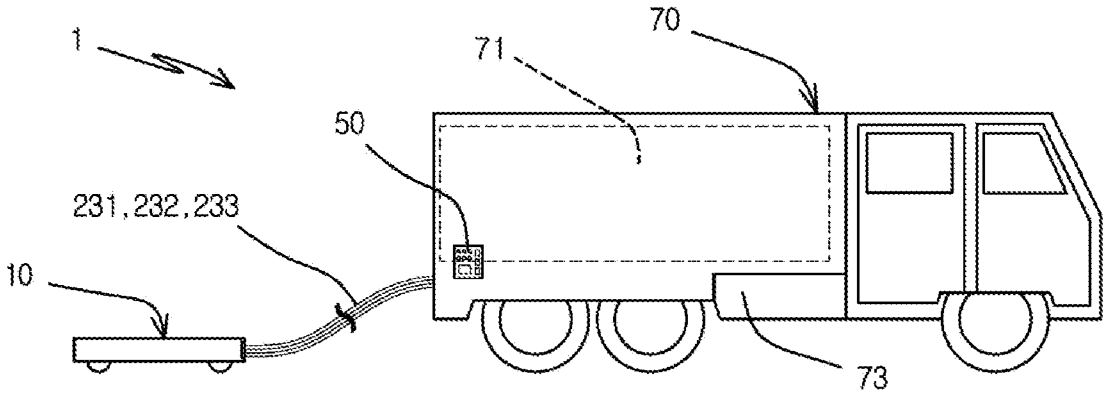
FIGS. 5A and 5B are schematic diagrams illustrating a fire extinguishing system for suppression of electric vehicle battery fire according to the present disclosure.

As shown in FIG. 5A, the fire extinguishing system 1 for suppression of electric vehicle battery fire according to the present disclosure includes a fire extinguishing device 10 and an electric vehicle fire extinguishing vehicle 70, which is a mobile means that supplies firefighting water or a fire extinguishing agent, hydraulic/pneumatic pressure, control signals, and power to the fire extinguishing device.

The fire extinguishing device 10 is a device which includes a nozzle tip rod 30 and a hydraulic/pneumatic cylinder 40 provided therein, wherein the nozzle tip rod is moved vertically by hydraulic/pneumatic pressure to protrude upward, and the protruding nozzle tip rod penetrates the battery pack on the bottom of the electric vehicle to be partially inserted thereinto.

The fire extinguishing device 10 is connected to the electric vehicle fire extinguishing vehicle 70 through a connection terminal 23 formed on one side thereof and receives firefighting water or a fire extinguishing agent, hydraulic/pneumatic pressure, a control signal, and power.

The electric vehicle fire extinguishing vehicle 70 may be a general fire engine or a special vehicle, and has a control panel 50, which controls the fire extinguishing device, installed on one side thereof to operate the fire extinguishing device through a line connection.

The electric vehicle fire extinguishing vehicle 70 described above is equipped with a fire extinguishing tank 71 that separately stores firefighting water or a fire extinguishing agent or both, and a control panel 50 that operates the fire extinguishing device 10 is installed on one side thereof and is connected to the fire extinguishing device through the firefighting water or fire extinguishing agent supply line 232, the control and power supply line 233, and the hydraulic/pneumatic pressure supply line 231 to supply the stored firefighting water or fire extinguishing agent to the fire extinguishing device, or to supply power or hydraulic/pneumatic pressure to operate each device.

In addition, the electric vehicle fire extinguishing vehicle 70 is further provided with a storage compartment 73 on one side thereof to store the fire extinguishing device. At this time, each supply line may be stored in a separate storage box, and may be connected and used only when necessary.

In addition, the electric vehicle fire extinguishing vehicle includes a lift provided on one side of the storage compartment or on the bottom surface of the storage compartment to facilitate an operation of placing down the fire extinguishing device to the ground or introducing the same into the storage compartment from the ground by the ascending/descending of the lift.

Figure 5B:
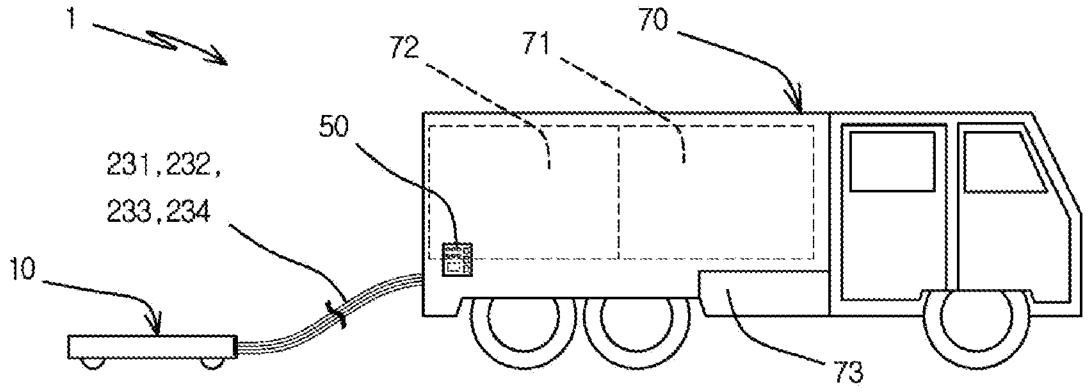

As shown in FIG. 5B, the electric vehicle fire extinguishing vehicle 70 of the fire extinguishing system 1 according to the present disclosure may be further provided with a recovery tank 72. The electric vehicle fire extinguishing vehicle 70 may be connected to the connection terminal 23 of the fire extinguishing device 10 through the discharge line 234, and one of the nozzle tip rods connected to the connection terminal may be installed inside the fire extinguishing device by using a pipe communicating with the discharge line. That is, among the nozzle tip rods 30 installed in the fire extinguishing device, some may be connected to the firefighting water or fire extinguishing agent supply line 232 to communicate with each other, and some may be connected to the discharge line 234 to communicate with each other.

When the plurality of nozzle tip rods 30 are separately connected to the firefighting water or fire extinguishing agent supply line 232 and the discharge line 234, firefighting water or a fire extinguishing agent may be injected from some nozzle tip rods 30 into the battery pack 91 to be charged inside the battery pack 91, and the firefighting water or the fire extinguishing agent charged inside the battery pack may be suctioned by the other nozzle tip rod 30 to be collected and recovered to the recovery tank 72 through the discharge line 234.

In addition, if firefighting water or a fire extinguishing agent is only injected into the battery pack, the internal pressure of the battery pack may become high due to the pressure caused by the injection while increasing the risk of explosion or causing damage to overpressure in the battery pack. Therefore, the pressure inside the battery pack may be lowered at or below a certain pressure by discharging the injected firefighting water or fire extinguishing agent to the outside through another nozzle tip rod, thereby reducing the risk of explosion due to the increased pressure caused by the injection.

In addition, a flow of firefighting water or fire extinguishing agent is generated within the battery pack by being injected through one side of the battery pack and suctioned and discharged through the other side of the battery pack, thereby enabling rapid stabilization of the battery pack.

In addition, the firefighting water or the fire extinguishing agent containing the electrolyte flowing from the battery module of the battery pack after stabilization of the battery pack may be collected to the recovery tank through the suction line and processed through a separate process. Accordingly, the battery electrolyte may be blocked from being discharged to the outside during the fire extinguishing process of the electric vehicle, to prevent contamination of soil, groundwater, or the like in nearby areas.

As described above, the fire extinguishing system 1 for fire suppressing of an electric vehicle battery according to the present disclosure enables quick dispatch to the burning electric vehicle 90 by using the electric vehicle fire extinguishing vehicle 70 and allows the fire extinguishing device 10 to descend and then penetrate the battery pack directly through the lower surface of the electric vehicle such that the firefighting water or the fire extinguishing agent is injected into the battery pack, thereby achieving quick stabilizing of the battery pack. Therefore, additional fires can be prevented to shorten the time for suppression of the electric vehicle fire. In addition, since there is no need for a bather for surrounding a burning electric vehicle and storing firefighting water or a fire extinguishing agent, fire extinguishing operation of electric vehicles can be performed even in a small place.

What is claimed is:

1. A fire extinguishing device for suppression of an electric vehicle battery fire, the fire extinguishing device comprising:

a mobile vehicle body equipped with a movable wheel to move to a space under an electric vehicle, and having a plurality of outlet holes formed through an upper surface thereof and a connection terminal formed on a side surface thereof;

nozzle tip rods vertically installed under each of the plurality of outlet holes of the mobile vehicle body, having a pointed upper end to penetrate a battery pack placed on a bottom of the electric vehicle when rising vertically, so as to be partially inserted into the battery pack, and having a plurality of nozzles formed on a side surface inserted into the battery pack, to inject firefighting water or a fire extinguishing agent supplied through the connection terminal;

hydraulic or pneumatic cylinders installed inside the mobile vehicle body to vertically move the nozzle tip rods by receiving hydraulic or pneumatic pressure through the connection terminal; and a control panel connected to the mobile vehicle body by a wire to control operation of the hydraulic or pneumatic cylinders, wherein a hydraulic or pneumatic lift is further installed on the mobile vehicle body such that a support protrudes downward to raise the mobile vehicle body when hydraulic or pneumatic pressure is supplied thereto, thereby enabling operation of the nozzle tip rods when the mobile vehicle body is in direct contact with the bottom of the electric vehicle.

2. The fire extinguishing device of claim 1, wherein fixing hooks are installed on both front and rear side surfaces of the mobile vehicle body, and the fixing hooks are rotated by hydraulic or pneumatic pressure to press both sides of a lower part of the electric vehicle, thereby fixing the mobile vehicle body to the lower part of the electric vehicle.

3. The fire extinguishing device of claim 1, wherein the connection terminal of the mobile vehicle body is connected to a hydraulic or pneumatic pressure supply line communicating with the hydraulic or pneumatic cylinders, a firefighting water or fire extinguishing agent supply line communicating with the nozzle tip rods, and a control and power supply line configured to supply various controls and power.

4. The fire extinguishing device of claim 1, wherein the nozzle tip rods have a screw-shaped upper end, and is gear-coupled to the hydraulic or pneumatic cylinders or an electric motor to receive rotational force so as to move upward while rotating.

5. A fire extinguishing system for suppression of an electric vehicle battery fire, the fire extinguishing system comprising:

the fire extinguishing device according to claim 1; and an electric fire extinguishing vehicle comprising a storage compartment configured to store the fire extinguishing device, and fire extinguishing tank configured to store firefighting water or a fire extinguishing agent, wherein the control panel of the fire extinguishing device is installed on one side of the electric fire extinguishing vehicle.

6. The fire extinguishing system of claim 5, wherein the electric fire extinguishing vehicle further comprises a recovery tank, and wherein the electric fire extinguishing vehicle communicates with the connection terminal of the fire extinguishing device via a discharge line, some nozzle tip rods among the plurality of nozzle tip rods of the fire extinguishing device are connected to and communicate with the discharge line instead of the firefighting water or fire extinguishing agent supply line such that the firefighting water or the fire extinguishing agent injected into the battery pack is discharged and collected to the recovery tank of the electric fire extinguishing vehicle through the discharge line, thereby preventing damage due to overpressure caused by the firefighting water or the fire extinguishing agent injected into the battery pack.

* * * * *